(12) United States Patent
Kubba et al.

(10) Patent No.: US 12,124,971 B2
(45) Date of Patent: Oct. 22, 2024

(54) ADAPTIVE RULE BASED ENGINE FOR QOS COMPUTATIONS OF INTERNET SERVICES OVER SATELLITE

(71) Applicant: Hughes Network Systems, LLC, Germantown, MD (US)

(72) Inventors: Rajeev Kubba, Clarksville, MD (US); Shivaram Sitaram, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 8 days.

(21) Appl. No.: 18/150,951

(22) Filed: Jan. 6, 2023

(65) Prior Publication Data

US 2023/0153656 A1 May 18, 2023

Related U.S. Application Data

(63) Continuation of application No. 16/819,052, filed on Mar. 14, 2020, now Pat. No. 11,580,423.

(Continued)

(51) Int. Cl.
*H04B 7/185* (2006.01)
*G06N 5/04* (2023.01)
(Continued)

(52) U.S. Cl.
CPC .............. *G06N 5/04* (2013.01); *G06N 20/00* (2019.01); *H04B 7/18519* (2013.01);
(Continued)

(58) Field of Classification Search
CPC .. H04B 7/18519; H04W 24/08; H04W 84/06; H04W 24/04; H04W 24/02; H04W 24/10; G06N 20/00; G06N 5/04
(Continued)

(56) References Cited

U.S. PATENT DOCUMENTS 9,900,082 B1 * 2/2018 Chowdhury ........ H04L 43/0876
10,582,262 B2 * 3/2020 Beattie, Jr. ........ H04N 21/25841
(Continued)

OTHER PUBLICATIONS

Big Data_Analytics_for_Automated_QoE_Management_in_Mobile_Networks; to Antonio; Aug. 2019 (Year: 2019).*

*Primary Examiner* — Hirdepal Singh
(74) *Attorney, Agent, or Firm* — Capitol City TechLaw; Jasbir Singh

(57) ABSTRACT

A method and system for service management of a complex network including: computing, at a computer, a weather impact score for geographic areas within a coverage area of a satellite; predicting, based on the weather impact score for each of the geographic areas, a degradation of at least one of the satellite links serving a respective geographic area; and sending a notification about the degradation. The method may include calculating, with a computer, a peak Quality of Service (QoS) for each of the satellite links; aggregating, for a duration, transmission errors to calculate an actual QoS for each of the satellite links; and displaying a drill-down dashboard comprising a color-code for each of the satellite links, wherein the color-code corresponds to a severity of a respective discrepancy between a respective peak QoS and a respective actual QoS of a respective satellite link.

19 Claims, 12 Drawing Sheets

Related U.S. Application Data

(60) Provisional application No. 62/896,979, filed on Sep. 6, 2019.

(51) Int. Cl.
*G06N 20/00* (2019.01)
*H04W 24/04* (2009.01)
*H04W 24/08* (2009.01)
*H04W 84/06* (2009.01)

(52) U.S. Cl.
CPC ............ *H04W 24/04* (2013.01); *H04W 24/08* (2013.01); *H04W 84/06* (2013.01)

(58) Field of Classification Search
USPC .......................................................... 706/12
See application file for complete search history.

(56) References Cited

U.S. PATENT DOCUMENTS

| | | | |
|---|---|---|---|
| 2014/0094113 A1* | 4/2014 | Kim ................... | H04B 7/18519 455/12.1 |
| 2016/0234281 A1* | 8/2016 | Padmanabhan ....... | H04L 67/568 |
| 2017/0155423 A1 | 6/2017 | Merchlinsky | |
| 2019/0288771 A1* | 9/2019 | Metzger ............. | H04B 7/18513 |
| 2019/0319868 A1 | 10/2019 | Svennebring et al. | |
| 2020/0225655 A1* | 7/2020 | Cella ................ | G05B 19/41875 |

\* cited by examiner

| OVERALL SYSTEM | | |
|---|---|---|
| USER's OVERVIEW | | |
| Total users | 0 | |
| Affected direction | Out route | In route |
| Possible service degradation | 0 | 9085 |
| Possible major issues | 0 | 26272 |
| Possible service outage | 2107 | 20 |
| NON-TRANSPORT LAYERS | | | | | |

| Category | CR | ND | MAJ | MIN | INF |
|---|---|---|---|---|---|
| Weatjer info | 0 | 0 | 0 | 0 | 0 |
| Service provisioning (L1) | 0 | 0 | 0 | 0 | 0 |
| Performance/SamKnows (L2) | 0 | 7 | 45 | 0 | 0 |
| Call volume (L3) | 0 | 0 | 0 | 1 | 0 |
| Churn (L4) | 0 | 0 | 43 | 0 | 0 |
| ELS (L5) | 0 | 0 | 24 | 24 | 0 |
| TRANSPORT LAYER DEVICES OVERVIEW | | | | | |
| Category | CR | ND | MAJ | MIN | INF |
| MG2PGW | 0 | 0 | 0 | 0 | 0 |
| WG2PGW | 2 | 0 | 0 | 0 | 0 |
| IPGW | 10 | 14 | 0 | 0 | 0 |
| IGM | 0 | 17 | 65 | 0 | 0 |
| WAS | 0 | 2 | 0 | 16 | 0 |
| CRO | 0 | 4 | 0 | 13 | 0 |
| SGW | 0 | 0 | 0 | 2 | 0 |
| SAN | 0 | 2 | 0 | 1 | 0 |

FIG. 7

ADAPTIVE RULE BASED ENGINE FOR QOS COMPUTATIONS OF INTERNET SERVICES OVER SATELLITE

CROSS-REFERENCE TO RELATED APPLICATIONS AND INCORPORATION BY REFERENCE

The present application is a continuation of U.S. patent application Ser. No. 16/819,052, filed Mar. 14, 2020, and claims the benefit under 35 U.S.C. 119(e) of U.S. Provisional Application Ser. No. 62/896,979, filed Sep. 6, 2019, which is incorporated herein by reference in its entirety.

FIELD

A complex network may include "Nested Networks" that may for example, number in the hundreds or more. An exemplary complex network may be a consumer service network. The complex network may serve millions of customers for example. The complex network may use thousands of network elements. A tool to help analyze and manage satellite backhaul based internet services is disclosed. The tool may analyze various aspects of the service. Based on the analysis, the tool may perform event correlation to highlight service issues at a link and component level. An exemplary link may include a satellite transport such as a beam. The correlations may minimize the troubleshooting time, reduce the number of resources required to run the service, improve system availability, quality of service, predict the network performance trends and the like.

The tool is flexible enough to handle the addition of future device types and information sources. The tool also scales as the network grows in users, network element counts, and data types.

BACKGROUND

A complex network system may include tens of thousands of network elements for providing Internet service to more than a million customers. With such a complex and growing network, Network Operations Center (NOC), Customer Service Representatives (CSRs) and Network engineers need to evaluate larger amounts of data, from an ever-growing number of sources. The data needs to be understood quickly in order to solve problems as they arise.

The prior art fails to quickly identify degradations or outages of transport networks, network equipment, weather event impacts. Without quick identification and conveyance of the issues to the necessary parties, remedies cannot be implemented quickly and user satisfaction suffers.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

In a satellite network providing Internet services over satellite, the monitoring and ensuring Quality of Services (QOS) provided to the end customers is a difficult and complex task for network engineers. Engineers manage the network by continuously analyze satellite link quality, hundreds of charts, data from thousands of network elements, emails, and reports coming from multiple sources. This is a tedious and challenging job.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a non-transient computer-readable storage medium having instructions embodied thereon to perform a method. The method includes: computing, at a computer, a weather impact score for geographic areas within a coverage area of a satellite; predicting, based on the weather impact score for each of the geographic areas, a degradation of at least one of the satellite links serving a respective geographic area; and sending a notification about the degradation. Other embodiments of this aspect include corresponding computer systems, apparatus, and computer programs recorded on one or more computer storage devices, each configured to perform the actions of the methods.

Implementations may include one or more of the following features. The method may include receiving transport related metrics for the satellite links; and confirming, based on the transport related metrics, the degradation. The method may include receiving transport related metrics for the satellite links; and correlating the weather impact score and the degradation with the transport related metrics for the satellite links, where the predicting of the degradation is based on the correlating. The complex network may include nested networks and each of the nested networks may include a subset of the satellite links. The method may include discovering, in near real-time, the degradation in the complex network of at least one of the satellite links; and compensating for the degradation with another of the satellite links. The complex network may include network elements. The method may include graphing, in near real-time, a logical view of the satellite links and network elements forming the complex network. The method may include playing back, in time, a status of the satellite links, the degradation and network elements forming the complex network. The method may include identifying a parameter for the satellite links and a threshold for the parameter with a machine learning algorithm; and adapting the threshold for the parameter based on the degradation. The method may include integrating the weather impact score over time to identify a weather impact on the complex network. The method may include syncing an operations and management change from a network operations center into a diagnostic. Implementations of the described techniques may include hardware, a method or process, or computer software on a computer-accessible medium.

One general aspect includes a non-transient computer-readable storage medium having instructions embodied thereon for a method. The method includes calculating a peak QoS for each of the satellite links; aggregating, for a duration, transmission errors to calculate an actual QoS for each of the satellite links; and displaying a drill-down dashboard may include a color-code for each of the satellite links, where the color-code corresponds to a severity of a respective discrepancy between a respective peak QoS and a respective actual QoS of a respective satellite link. Other embodiments of this aspect include corresponding computer systems, apparatus, and computer programs recorded on one or more computer storage devices, each configured to perform the actions of the methods.

Implementations may include one or more of the following features. The method where the displaying may include displaying a weather icon for one or more of the satellite links. The displaying may include displaying a color-code icon for the satellite links, where the color-code icon corresponds to a fault severity of a network element servicing the respective satellite link. The displaying may include displaying a detailed statistic associated with the selected satellite link. The displaying may include displaying the respective events of the selected satellite link. Each of the satellite links has an associated parameter and value, and the correlating correlates the associated parameter and value with the actual qos, and the method further may include adapting the parameter and value to minimize the respective discrepancy for the respective satellite link. The method may include correlating, for each of the satellite links, events within and associated with the complex network to the actual QoS; and predicting a trend based on the correlating. The method may include correlating, for each of the satellite links, events within and associated with the complex network to the actual QoS; and suggesting actionable item based on the correlating. Implementations of the described techniques may include hardware, a method or process, or computer software on a computer-accessible medium.

Additional features will be set forth in the description that follows, and in part will be apparent from the description, or may be learned by practice of what is described.

DRAWINGS

In order to describe the manner in which the above-recited and other advantages and features may be obtained, a more particular description is provided below and will be rendered by reference to specific embodiments thereof which are illustrated in the appended drawings. Understanding that these drawings depict only typical embodiments and are not, therefore, to be limiting of its scope, implementations will be described and explained with additional specificity and detail with the accompanying drawings.

FIG. 7 illustrates a service status dashboard with ARBE according to various embodiments.

Figure 1:
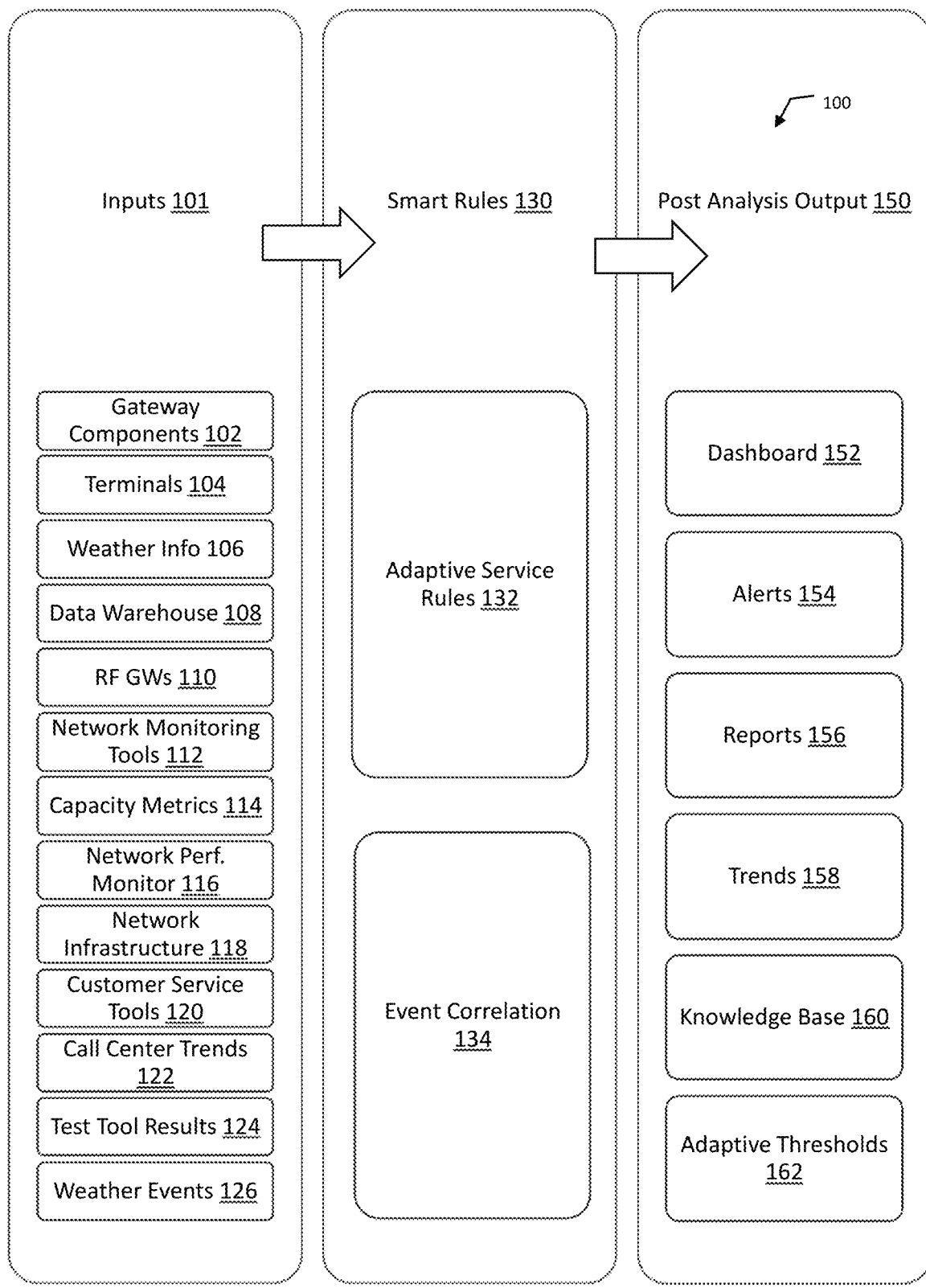
FIG. 1 illustrates a service management with Adaptive Rule Based Engine System according to various embodiments.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The present teachings may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

Complex networks may use satellite transport to communicate with User Equipment (UE). Next generation bent pipe satellites support raw throughput in excess of 300 Gbps, for example, in the Ka-band. These satellites provide Internet access services. The satellites use multiple gateways and spot beams, for example, about 35 primary Gateways and 200 spot beams. The gateways service UE such as remote terminals with the spot beams to provide the terminals with Internet access via the satellite based backhaul.

The growing complexity of such complex networks requires a flexible and scalable solution as disclosed herein. In some embodiments, an Adaptive Rule Based Engine (ARBE) based method and system may be used. The ARBE may be distributed and designed around a framework to allow for continued future expansion without redesign. An exemplary framework includes the Apache Storm framework.

A service management system and method that uses Adaptive Rule Based Engine (ARBE) for Satellite Networks for operations and management of these complex networks is needed. The ARBE takes aspects of the internet service transport related metrics (for example, bit errors, latency, throughput, congestion, packet loss, and the weather impact etc.) to predict possible network degradation or failures. In some embodiments, ARBE correlates the transport metrics with the associated meta data of the complex networks such as customer call/complaints, customer service trends in its detection and prediction.

In some embodiments, the weather impact at a location of a gateway or a location of a user equipment may provide cogent information and correlation to customer calls/complaints, customer service trends in its detection and prediction. ARBE may compute a weather score for the actual weather and an effect of that weather on the transport system based on the historic information. The weather score is used by the ARBE to identify and segregate the weather impacted network issues and non-weather impacted network issues. The ARBE may be used for complex networks that include satellite transport.

In some embodiments, ARBE provides a comprehensive view of Network Element (NE) status along with events correlation among the multiple information sources and components. The ARBE may make adaptive adjustments to its comparison thresholds based on the historic and ongoing trends of the satellite system by running machine learning algorithms on parameters collected from various satellite devices and subsystems.

Benefits from the Adaptive Service Monitoring Engine

Exemplary benefits/solutions to the problem of complex network monitoring to assist the Network Operations Group in the areas such as system maintenance, upgrade, modeling and troubleshooting include:

- Near real-time discovery of faults in the networks to minimize system outage times.
- Near real time computation of the number of users experiencing service degradations, major issues, and service outages based on the results of the configured Smart Rules.
- Near real-time status of the complex network in a simple view graph.
- Real time status of various network elements and components.
- Track the trends of Service provisioning and User satisfaction, issues in conjunction with transport networks status.
- Auto and/or cross correlation between the measured trends (such as, bit errors, latency, throughput, congestion, packet loss and associated events) of the various network elements and associated events (like customer complaints, weather, system's knowledgebase etc.) to detect/predict problems in the system.
- Tuning the service rule evaluations based on intelligent thresholds computed by running machine learning algorithms on the parameters collected from various system components, associated data sources and associated systems information.
- Operator friendly Graphics User Interface (GUI) to configure simple or complex service rules used by a core Rule-Engine to adapt itself to custom monitoring needs of complex networks.
- A "Network Playback" engine to go back in time and view the status of components in the network and various associated issues identified by the tool.
- Display logical, as opposed to physical, network mapping to allow actionable network management.
- Display network status topology can be easily customizable to different types of network.
- Multiple ways to get information from network elements by, for example, Web page-based parameter scraping, SNMP MIB polling, HTTP/REST based API's, SQL engine, Excel Sheets or the like.
- Integrate weather information to identify the impact of weather events on the network.
- Reduce troubleshooting time for engineers and amount of resources required to run the service.
- Scalability to allow for the monitoring of tens of thousands of network elements.
- Scalable architecture to deploy it across various consumer networks.
- Automated alerts for the Network Management Team.
- Reduced training time for network operators and engineers.
- A Test Management Suite to observe the near- and long-term behavior of new software releases.
- Automated syncing of operations and management changes from Network Operation's Center into 'Smart-Diagnostics'.

Adaptive Rule Based Engine Based Service Management System

FIG. 1 illustrates a Service Management with Adaptive Rule Based Engine System tool according to various embodiments.

An ARBE tool 100 provides near real-time analytics for consumer networks and serves as a central informational/troubleshooting tool for operations and engineering teams. With the ever-changing consumer network, the ARBE 100 provides near real-time view of the network topology and the "Nested Networks".

By incorporating the near real-time data collection from myriad of sources such as gateway components 102, terminals 104, weather information 106, data warehouse 108, RF gateways 110, Network Management tools 112, capacity metrics 114, network performance monitor 116 (for example, Science Logic EM7), network infrastructure 118, Customer service tools 120 (for example, surveys), call center trends/ELS 122, Test tool results 124, Weather Events 126 and the like. The tool 100 performs in-depth analysis using a Smart Rules Engine 132 and provides constant feedback on the network and service status to a network center.

The terminals 104 may include a random sample of terminals as a representative set of terminals operating in each pre-defined beam area within a geographic coverage area of the satellite.

Call center Trends 122 may use a periodic Early Life Satisfaction (ELS) survey conducted for select customers. For example, customers who are within 90 days of new satellite-based service. Based on the survey answers a satisfaction score may be assigned for each surveyed customer to indicate Internet service quality perceived by those customers.

Test tool results 124 may be obtained by one more network health monitoring terminals. These terminals may not carry users pay load, but may be used to run multiple network diagnostics tests. The network diagnostics test may periodically test standard Internet connectivity and performance. Results of the network diagnostics test may be stored centrally, for example, in an accessible web location.

By incorporating the machine learning algorithms on the parameters collected from various network system components and remote terminals, the ARBE 100 may predict thresholds that may be feedback into the smart service rule-engine 130 using adaptive service tools 132 to perform adaptive network monitoring with the tool 100.

The smart service rules engine 130 can take inputs 101 in numerous formats (for example, SNMP, JSON, REST, SQL, file imports, HTML scraping, or the like) from multiple inputs 101 and conduct event correlation 124 to product alerts. The inputs 101 may be interpreted by a custom or smart rules engine 130 for analysis. A post analysis of an output 150 from the smart rules engine 130 can provide network status in various formats. The output 150 may be displayed in a dashboard 152 to logically illustrate the network and network elements. The dashboard 152 can display data in aggregate. The output 150 may include alerts 154 and reports 156. This creates a generalized monitoring architecture for easy integration of new devices and data types. The output 150 may include trends 158. The output 150 may supplement a knowledge base 160 of the network operations center. In some embodiments, the output 150 may include adaptive thresholds 162 that can be used to fine tune the network or may be used to compensate for network elements and links not performing optimally.

Overview

Figure 2A:
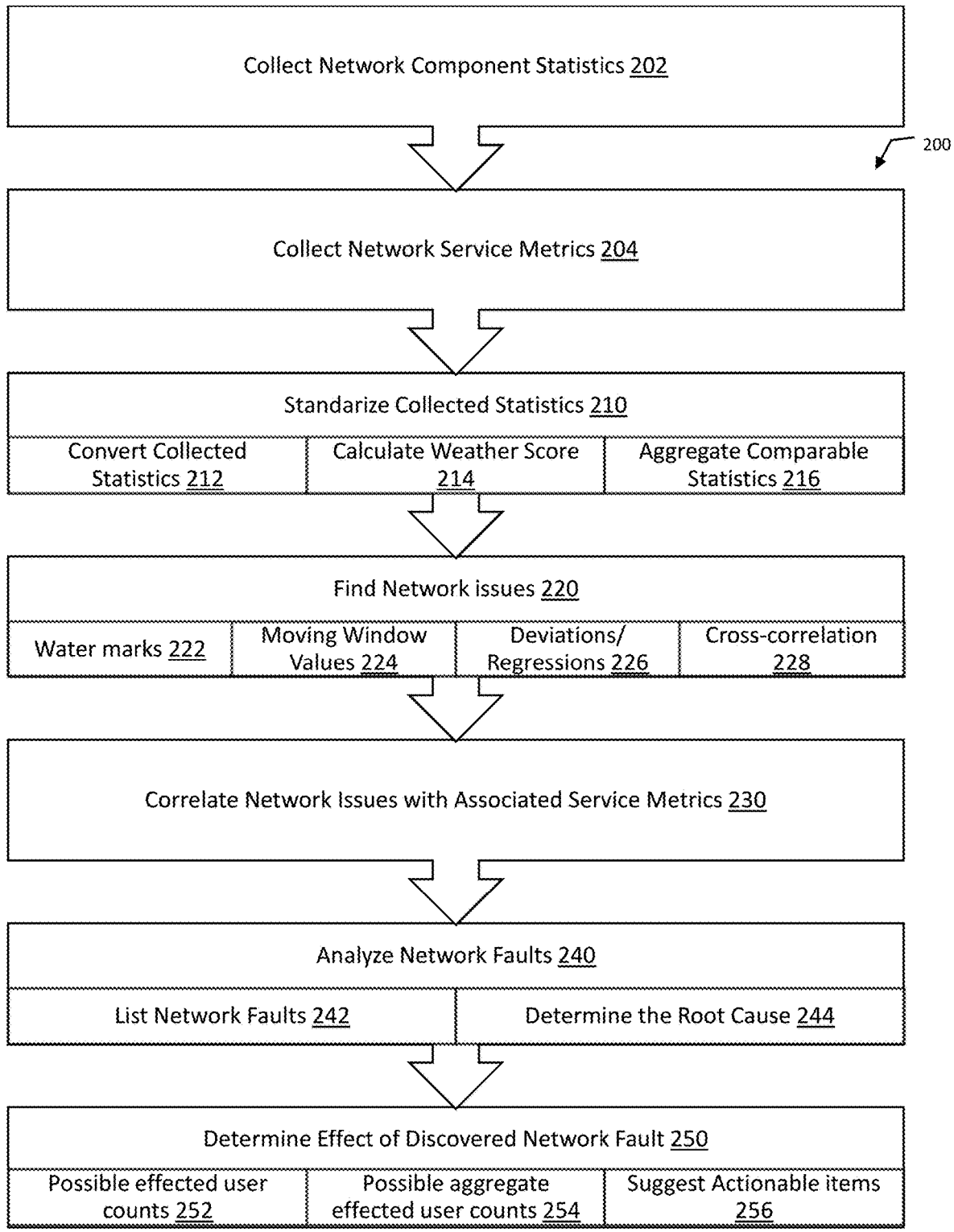
FIG. 2A illustrates an exemplary method for determining satellite network faults and effects according to various embodiments.

FIG. 2A illustrates an exemplary method for determining satellite network faults and effects according to various embodiments.

FIG. 2A illustrates a method 200 for providing enhanced network fault detection by considering multiple statistics from multiple instances of multiple source types, associated service metrics and aggregating them together according to both geographic and network segment similarities.

The method 200 includes operation 202 to collect network component statistics. The collection of the network component statistics may be a real-time. The collection of network component statistics may include raw data that has been initially collected from gateway devices, networking components, 3rd party data generators, weather portals, end user terminals and the like. In some embodiments, the network component statistics may include statistics for inroutes, outroutes, physical devices (for example, Blade), terminal, weather data, and RF components.

The method 200 includes operation 204 to collect network service statistics. The collection of the network service statistics may be in real-time including raw data or maybe after aggregation by other systems. Exemplary network service metrics are collected from Call center reports, customer service calls, performance reports from health monitors, third party data sources like weather information, service installation results or the like.

The method 200 includes operation 210 to standardize and initially process the collected statistics (both component and service statistics). This data is then converted per operation 212 into comparable statistics via type and scale conversion, time aggregation, mathematic processing, combining, and/or custom analysis (for example, generating satellite networking specific weather scores from reports collected by 3rd party vendors). The comparable statistics may include uniform and comparable data types (for example, Mbps, Error %, or the like). The method 200 may include operation 214 to calculate weather scores from the collected weather data. The weather scores may be included in the comparable statistics. The method 200 may include operation 216 to aggregate the comparable statistics. Operation 216 may aggregate the comparable statistics as desired, for example, by geographic areas, by network divisions, topologic network groupings or the like.

The method 200 includes operation 220 to find network issues currently effecting the network. In operation 220, a rules engine runs pre-defined smart rules. The smart rules may be of-the-shelf or be customized (defined) by a network engineer. To find network issues, the smart rules may compare values against water marks at operation 222, moving window values at operation 224, and standard deviations/regressions with self or other components at operation 226. At operation 228, the statistics may be cross correlated with each other. The cross-correlation may various datasets, for example, dataset for a geographic area, a network division, across the network.

The method 200 includes operation 230 to correlate the network issues found/detected in operation 220 with associated service metrics collected in operation 204. Service metrics include, for example, problem reports from the customer care center, computed weather score values, installation reports associated with the corresponding geographic locations to understand the relation between them, or the like.

The method includes operation 240 to analyze the faults detected. With a list of faults detected at operation 242, the faults may then be analyzed alongside the originally collected data, converted data, collated network data and service data to determine a root cause of the network fault at operation 244. Several problems may be the result of a single point of failure elsewhere in the network, so analyzing the service status may indicate a problem cause by a device that may not be directly queried itself or that may not have an otherwise easily identifiable pattern. Analysis of the results derived in the above step may discover a single or multiple root cause for problems seen in the network.

With the analysis of network faults at operation 240 the method 200 may use the correlated network and associated service metrics, to determine an effect on the network at operation 250. An operation 252 may compute the number of possibly effected user terminals based on, for example, the geographic coverage areas being affected, a status from user terminals in the area. An operation 254 may compute the number of possibly aggregate effected user terminals based on, for example, the geographic coverage areas being affected, a status from user terminals in the area.

With previous steps having identified and current state of the network, the root causes of any active network issues, and the impact they are having, the system can now identify what, if any, actions should be taken by the network operators to resolve any fixable errors at operation 256. If the errors are entirely transient and out of an operator's control (for example, inclement weather in a service area), then the operator can be informed that no actions need to be taken.

Figure 2B:
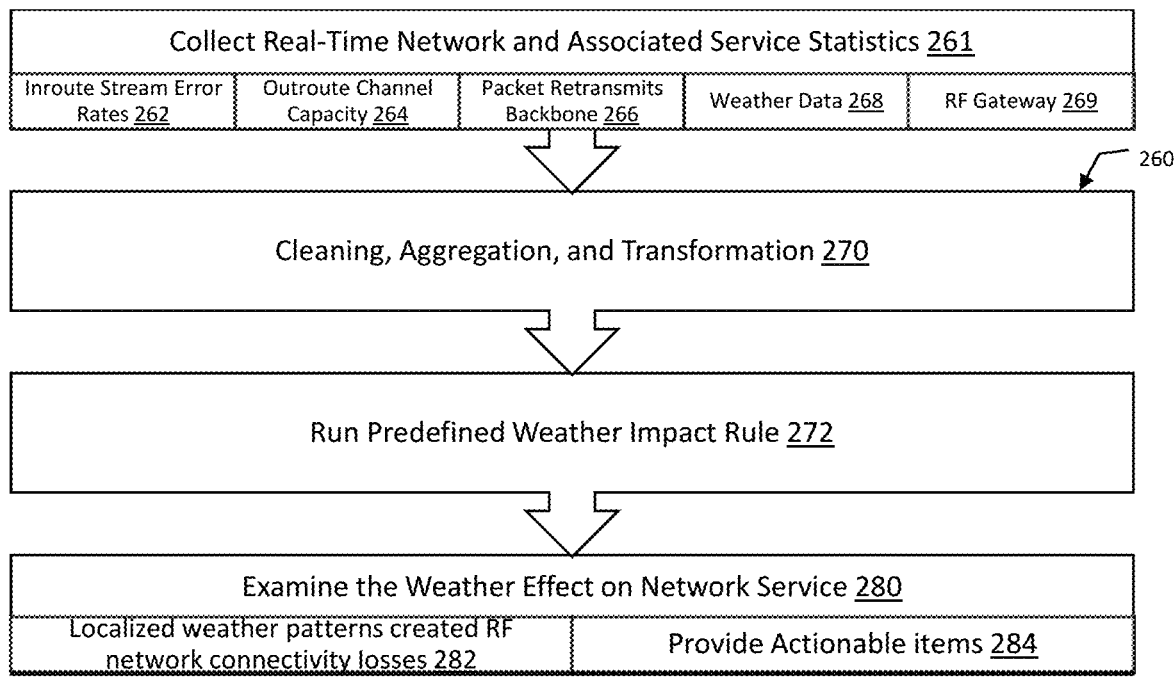
FIG. 2B illustrates an exemplary method for identifying service issues caused by inclement weather impact on an RF channel used by a satellite network.

FIG. 2B illustrates an exemplary method for identifying service issues caused by inclement weather impact on RF channels used by a satellite network.

A method 260 for identifying service issues caused by inclement weather impact on RF channels used by a satellite network is disclosed. The method may include operation 261 to collect real-time network and associated service statistics. Raw data is initially collected from gateway devices, networking components, third party data generators, weather portals, and end user terminals. Collected values for weather analysis include inroute stream error rates 262, outroute channel capacity 264, satellite backbone packet retransmit counts 266, weather data 268 including descriptions, precipitation rates, and RF gateway status parameters 269.

The method may include operation 270 to clean, aggregate, and transform the collected raw data for analysis. Operation 270 may convert collected values to uniform data types (mbps, error %, percentages or the like) for comparison across devices and time. Operation 270 may use the collected weather data to calculate local weather scores based on the weather descriptions and precipitation rates in the collected data to calculate a custom weather score. The weather score may be averaged over each geographic service area. Operation 270 may aggregate network data and weather scores over geographic areas.

With the requisite data in comparable numeric formats, the rule engine continuously updates and runs a predefined weather impact rule at operation 272. Operation 272 updates the historic watermarks and normal operational levels of 'Inroute Stream Error', 'Outroute Channel Capacity', and 'Packet Retransmit Rates in the Satellite Backbone Link' under normal operational conditions (while no outage or service degradation experienced by remote satellite terminal) for each geographic service area. The statistics are cross correlated with each other, both in their geographic area and across the network. Exemplary transport layer statistics include inroute stream error rate increase in an area, outroute channel capacity decrease in the area, increased packet retransmits in link servicing the area, calculated weather score increase in the area.

Any observed deviations of error statistics (outside configurable deviation limits) concurrent with an increase in weather score triggers an examination of the impact of the weather on network service in the affected geographic area at operation 280. When examining the impact of weather in the affected area, the system analyzes transport level statistics collected from the terminals in the geographic area. The system uses transport layer statistics collected from the terminals to classify and enumerate the number of terminals that are experiencing service degradations or outages.

Having determined the severity of the service degradation, the process determines whether localized weather patterns created RF network connectivity losses in the specific geographic region at operation 282. If weather is not the root cause, operation 282 may alert the NOC that service issues are transient and the result of a weather system local to the geographic service area. When network elements show errors and the weather is the root cause network degradation, the system provides actionable items to be completed by the NOC at operation 284.

Events and Historic Data Correlation Adaptive Rule-Engine

Figure 3:
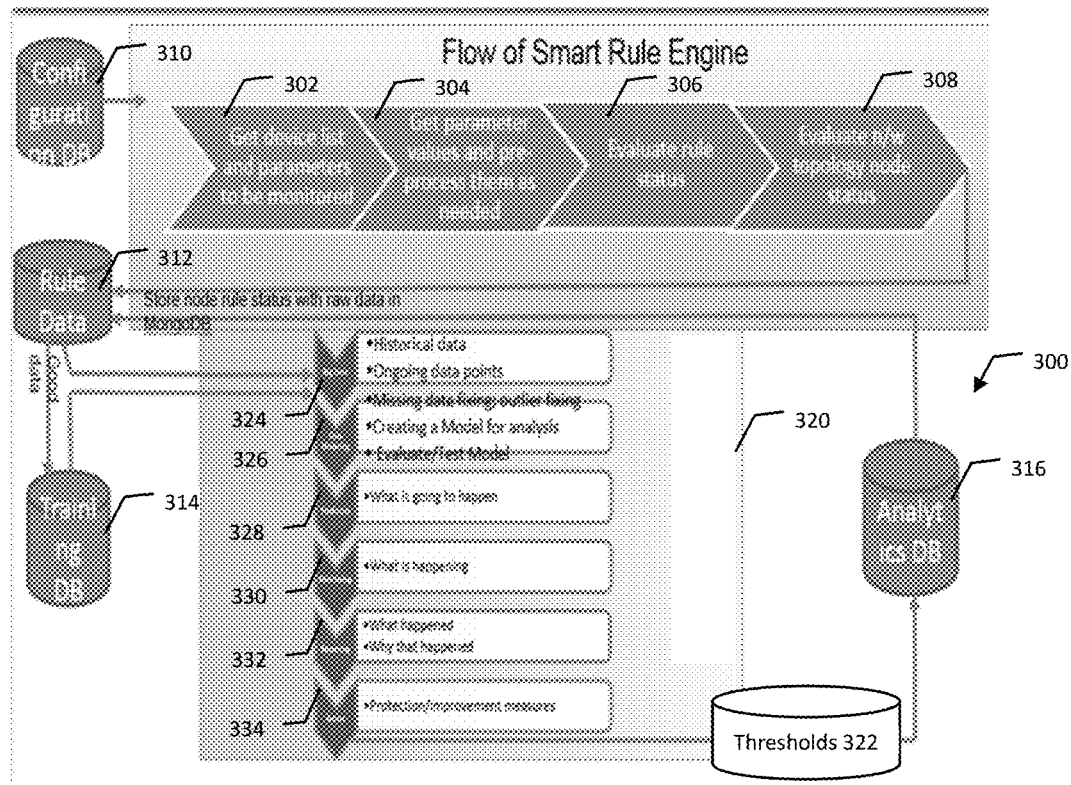
FIG. 3 illustrates an Adaptive Thresholds generation loop of Adaptive Rule Based Engine according to various embodiments.

FIG. 3 illustrates an Adaptive Thresholds generation loop of Adaptive Rule Based Engine according to various embodiments.

FIG. 3 illustrates an Adaptive Thresholds generation loop of Adaptive Rule Based Engine 300. The rule-engine 300 runs parallel data analysis on data collected from thousands of network elements at scheduled intervals. The ARBE periodically takes the inputs from an 'adaptive threshold' computation system 320 which runs machine learning algorithms on the output of the rule-engine 300 in rule data 312 and training data 314 needed to model and compute the consumer network system's operational status and health.

The adaptive threshold computation system 320 may leverage big data 324 to receive historical data and ongoing data points. The adaptive threshold computation system 320 may leverage data modeling 326 to fix the missing data, to fix outliers, to create a model for analysis and to evaluate and test the model. The adaptive threshold computation system 320 may perform predictive analysis 328 to determine what is going to happen. The adaptive threshold computation system 320 may monitor 330 various network elements to determine what is happening. The adaptive threshold computation system 320 may provide reporting 332 to determine what happened and why that happened. The adaptive threshold computation system 320 may provide actionable items 334 to inform a user of protection and improvement measures. The adaptive threshold computation system 320 may store predictions and thresholds in thresholds database 322.

The ARBE 300 may do event comparisons and correlation using standard and custom-built statistical functions. Exemplary custom correlation rules that may be setup for the service monitoring in the ARBE 300 based system include:

Historic values of a network element's metrics vs. expected constant values

Historic values of a network element's metrics vs. historic values of similar network elements in a specified location of network topology Historic values of a network element's metrics vs. historic values of different kinds of network elements in a specified location of network topology Current values of a network element's metrics vs. expected constant values Current values of a network element's metrics vs. historic values of similar network elements in a specified location of network topology Current values of a network element's metrics vs. historic values of different kind of network elements in a specified location of network topology In some embodiments, the Rule-Engine periodically takes the inputs from the system to be monitored. ARBE 300 may run its machine learning algorithms on the inputs and provides adaptive thresholds to the configured service monitoring rules for computing the system's operational status and trends.

Architecture

Figure 4:
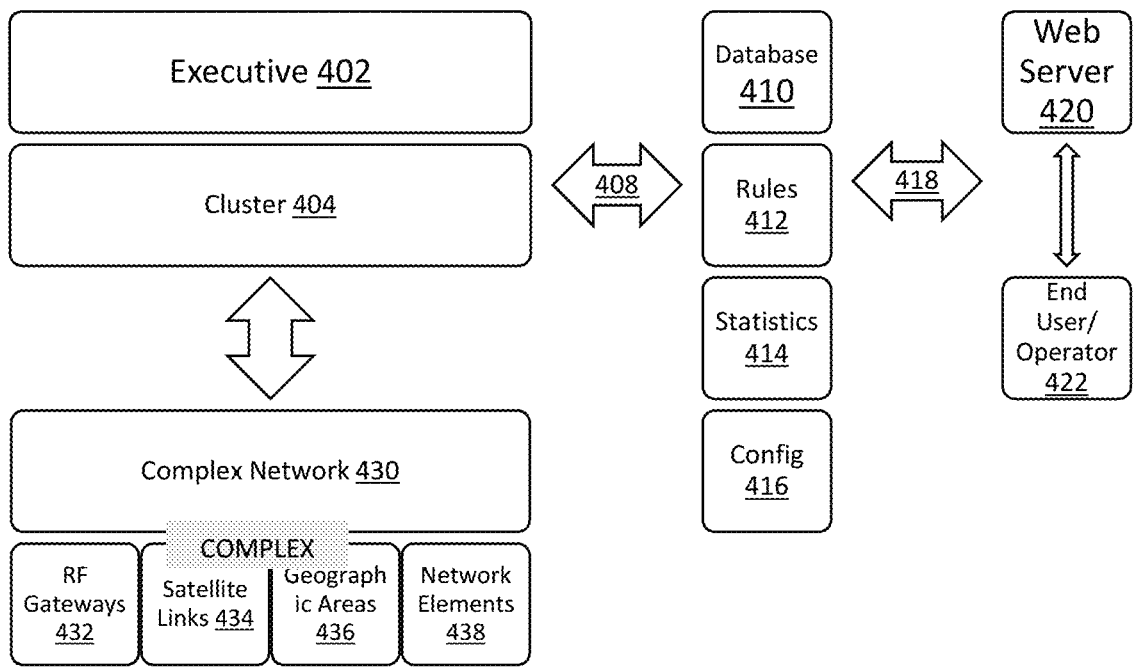
FIG. 4 illustrates an ARBE's software architecture according to various embodiments.

FIG. 4 illustrates an ARBE system according to various embodiments.

An ARBE system 400 is designed for real-time distributed processing. A cluster 404 of computers perform the real-time distributed processing. A database 410 (for example, a relational database management system) provides sanity enforcement for the system 400, while storing and managing rules 412, statistics and parameters 414, and configuration 416 of data sources via a connection 408. In one embodiment, the Apache Storm distributed architecture system may be used to provide reliability and scalability of processing power.

The cluster 404 hosts sub engines for data collection, raw data manipulation and cleaning, and for rule evaluation. The processed data is stored in a distributed replica set in the database 410.

A webserver 420 is connected via link 418 to take input from the database 410 including the distributed replica set to create dashboards, for example, a drilldown dashboard. This provides helicopter level view of a complex network 430 and microscopic views for actual problem drilldown. An operator 422 may connect to the webserver 420 to manage the rules 412, statistics and parameters 414, and configuration 416 stored by the database 410 via the link 418.

The complex network 430 is not part of the ARBE system 400 but is connected to it. The complex network 430 may be a distributed network. The complex network 430 may include RF gateways 432, satellite links 434 serviced by one or more of the RF gateways, a satellite (not shown), geographic areas 436 served by one or more of the satellite links, and network elements 438.

Figure 5:
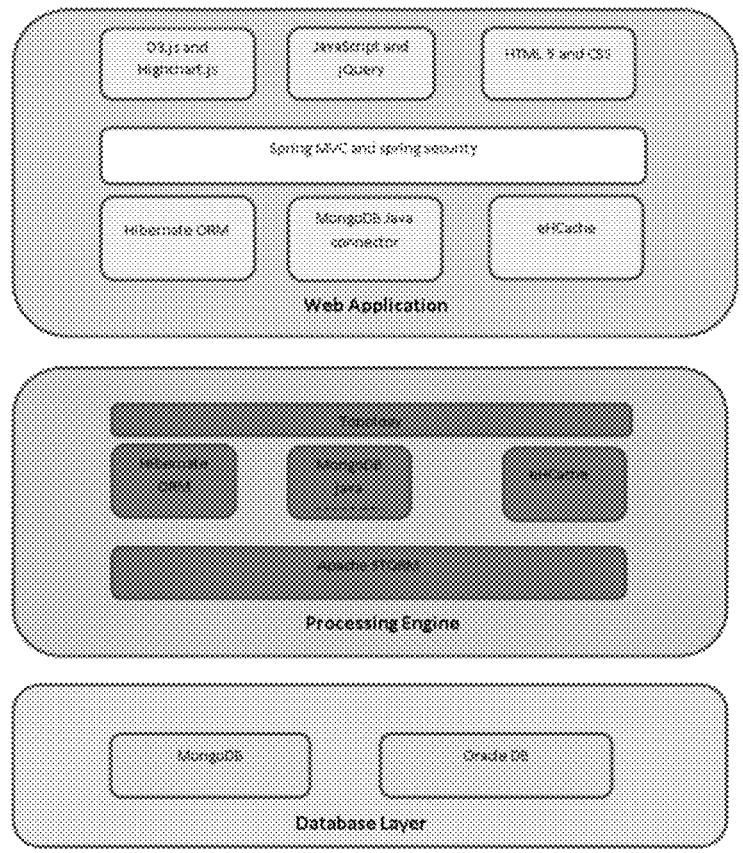
FIG. 5 illustrates an ARBE's software stack according to various embodiments.

FIG. 5 illustrates an ARBE's software stack according to various embodiments.

Near Real-Time Discovery of Faults

Figure 6:
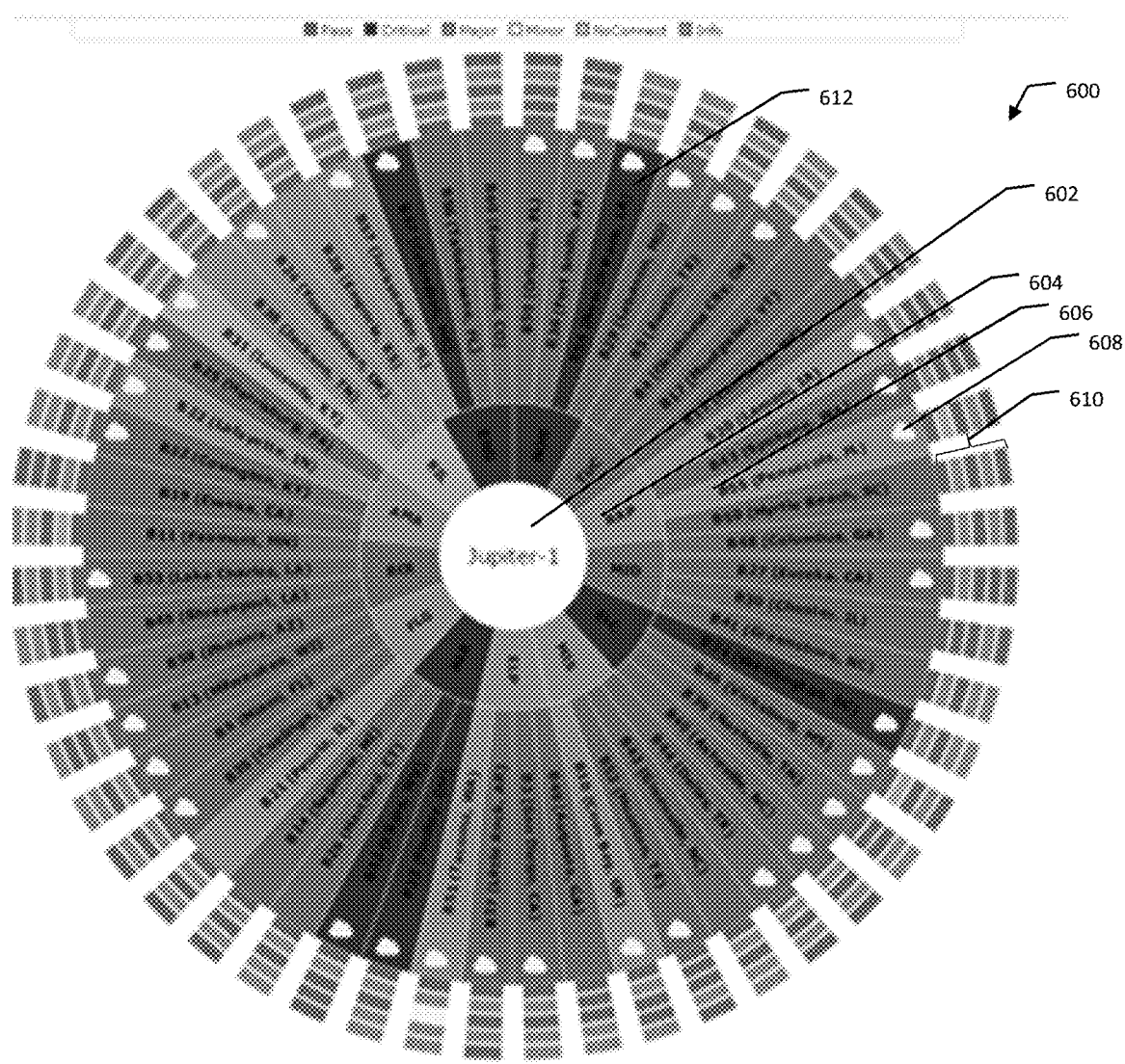
FIG. 6 illustrates a system status dashboard with ARBE according to various embodiments.

FIG. 6 illustrates a system status dashboard with ARBE according to various embodiments.

The diagnostic system does the near real-time discovery of faults, display and navigation in simple view graphs. For example, a system Dashboard gives a high-level overview of the systems' Gateway (GW) components and Terminals present status or network based on event correlations.

In FIG. 6, various rings can be used to convey network status of various nested networks within the complex network. In the present illustration ring 602 names the complex network. Ring 604 names various network operation centers that form the complex network. In some embodiments the outer edge of the ring 604 may display a weather icon (not shown) to convey weather conditions for each of the network operation centers. The network operation centers may house the RF gateways serving the complex network. Ring 606 names and groups geographic cells as wedges extending from the ring 604 associated with the operation centers represented in ring 604. In some embodiments, an outer edge of ring 606 may display a weather icon 608 to represent weather conditions for each of the geographic cells. The weather icon 608 may be color-coded to indicate a weather impact score range for the geographic cell. Additional outer rings 610 may be associated with various types of network elements or network layers serving the associated geographical area. Portions within the rings may be color-coded to represent different statuses of the particular network operation center, geographic area, or the like. For example, green may be used to represent that everything is fully operational, yellow may be used to represent that some portions are stressed or suffering a minor degradation in performance, and red may be used to represent that there is severe degradation in network performance. Exemplary wedge 612 is represented in a different color to readily make apparent that the weather at the associated geographic area (identified within the wedge 612) is negatively affecting the associated channel conditions.

Early Detection of Service Impacts on the Users

FIG. 7 illustrates a Service status dashboard with ARBE according to various embodiments.

Figure 10:
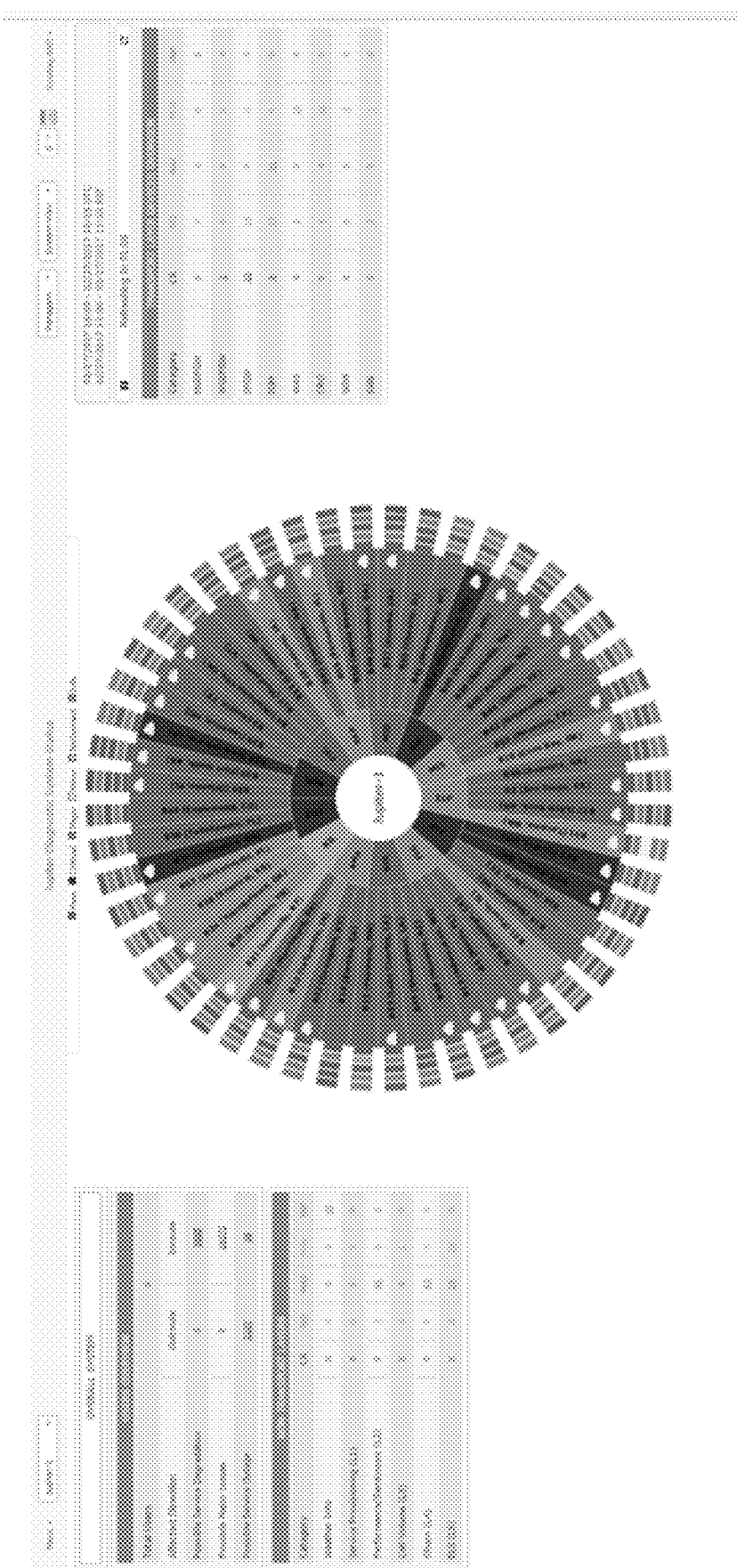
FIG. 10 illustrates network playback with ARBE according to various embodiments.

The diagnostic system does the near real time computation of the number of users experiencing service degradations, major issues, and service outages based on the results of the configured Smart Rules, shown in the system dashboard of FIG. 7. By understanding the topology of the network, the ARBE is able to avoid duplication of affected users and calculate the total number of users being affected on Beam, Gateway, and Network levels. All or portions of the service dashboard of FIG. 7 may be color-coded and displayed along the system status board of FIG. 6 as illustrated in FIG. 10 for example.

Status of the Complex Network in a Topological Graph

Figure 8A:
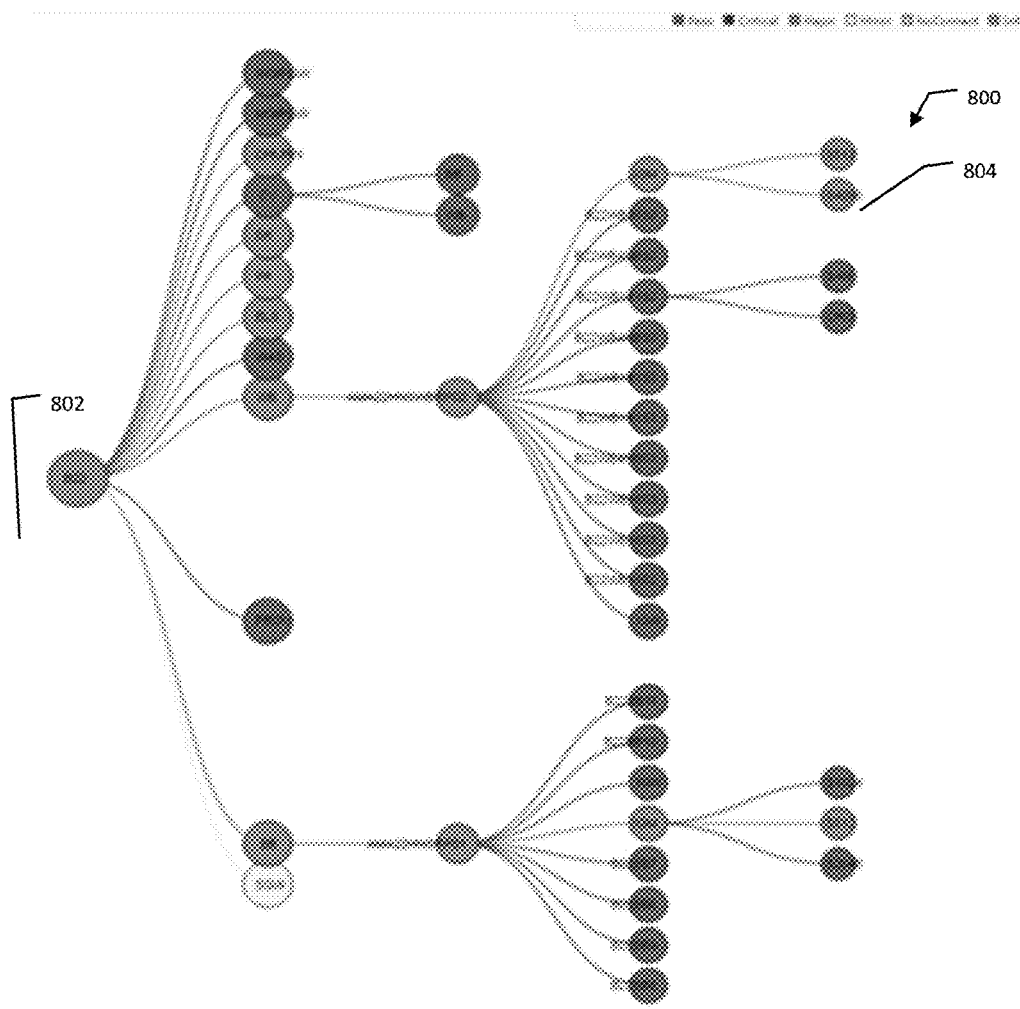
FIG. 8A illustrates a dynamically discovered network topology with statuses for network element according to various embodiments.

FIG. 8A illustrates a Dynamically discovered Network Topology with Network Element's status according to various embodiments.

By color-codding the components of a beam in a topological graph 800, an operator may quickly see if an issue is affecting all of the devices in a beam, a subset of the devices, or a specific "branch" in a beam. This allows operators to see the severity and extent of a problem at a glance. The view of FIG. 8 gives the network component's status at a selected time frame for a selected gateway and beam. A root 802 of the topographical graph 800 may represent network operation Center. A selected node 804 may color coded to identify degraded/affected network nodes using the nested network topology.

Figure 8B:
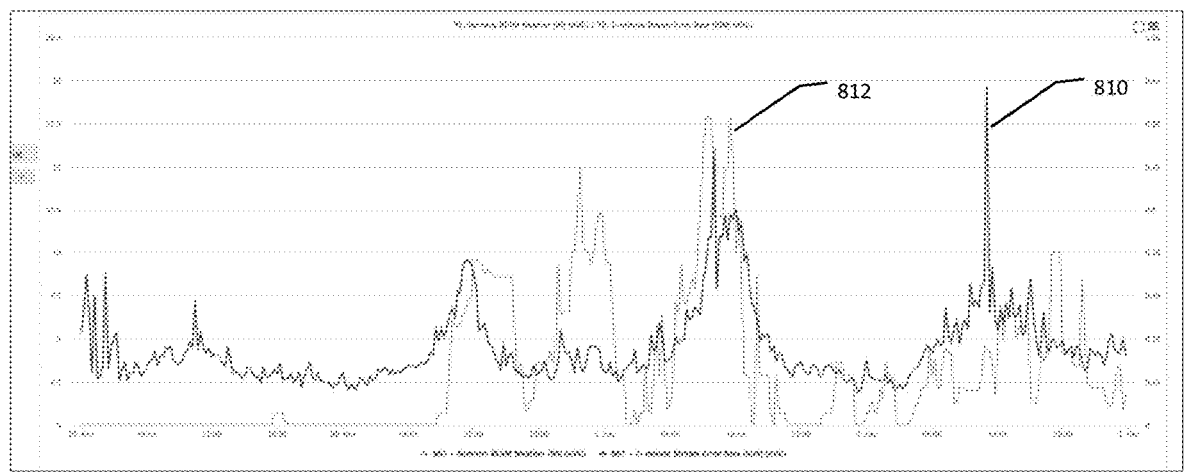
FIG. 8B illustrates a parameter comparison dashboard according to various embodiments.

FIG. 8B illustrates a parameter comparison dashboard according to various embodiments.

With FIG. 8B an operator may verify that the Satellite's coverage in a selected area at a selected time was facing rain fade. Line 810 tracks the weather impact score and line 812 tracks an error rate across the satellite beam covering the selected area. An increase in detrimental weather conditions correlates with an increasing error rate across the satellite beam covering the selected area. When an increase in error rate does not correlate with the weather impact score the ARBE may alert the operator and may suggest corrective actions.

Figure 8C:
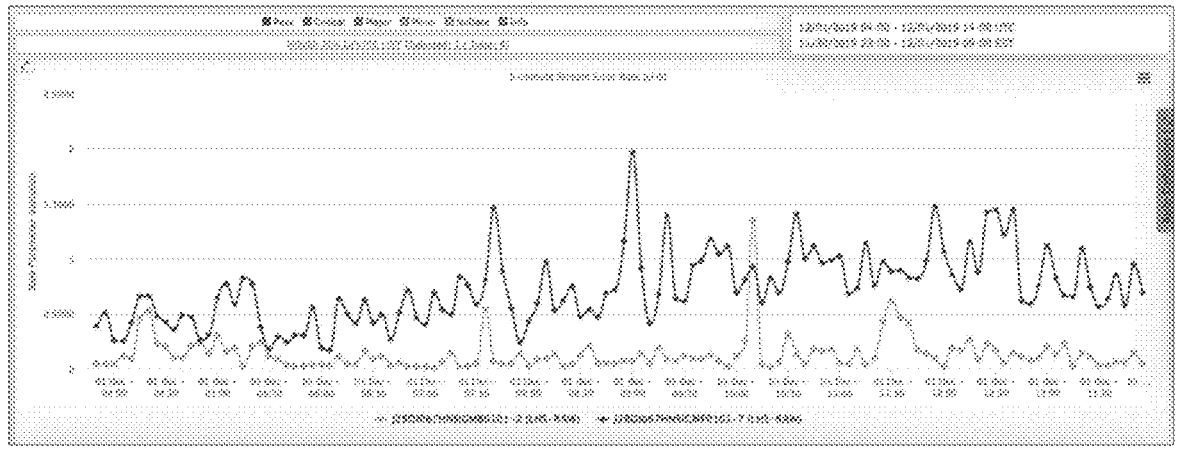
FIG. 8C illustrates an inroute's device dashboard according to various embodiments.

FIG. 8C illustrates an inroute's device dashboard according to various embodiments.

With FIG. 8C an operator may verify that an inroute device dashboard shows increased Inroute error rates on the inroute device and the terminals in that area are moving out of a higher symbol rate channel coding due to errors during that time.

Figure 8D:
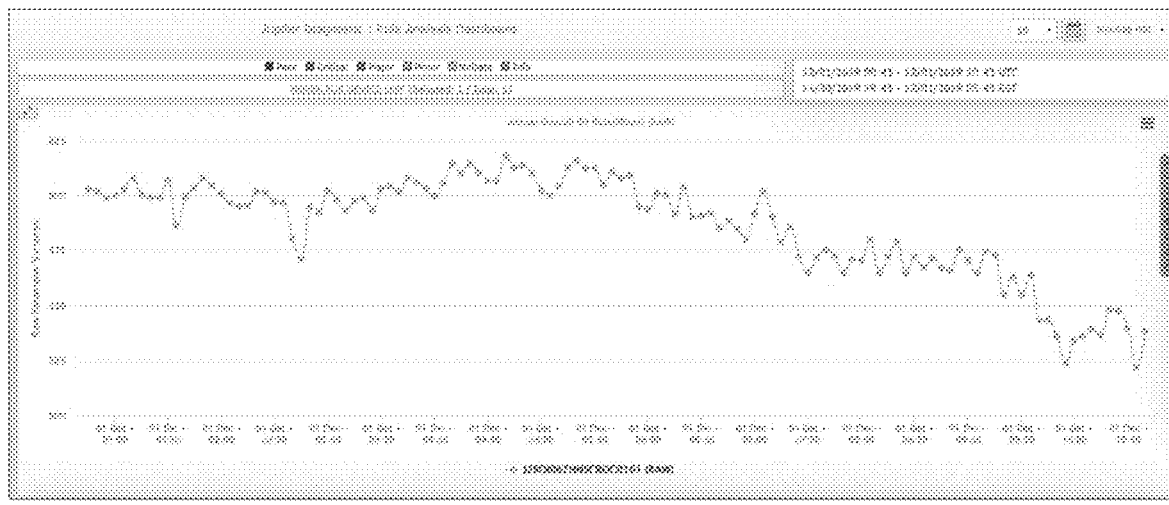
FIG. 8D illustrates an outroute's device dashboard a dynamically discovered network topology with statuses for network element according to various embodiments.

FIG. 8D illustrates an outroute's device dashboard a dynamically discovered network topology with statuses for network element according to various embodiments.

With FIG. 8D an operator may verify that an outroute device dashboard shows reduced outroute channel capacity, since a lower symbol rate channel coding should be in use to mitigate the rain fade effect in the Outroute during that time.

Figure 8E:
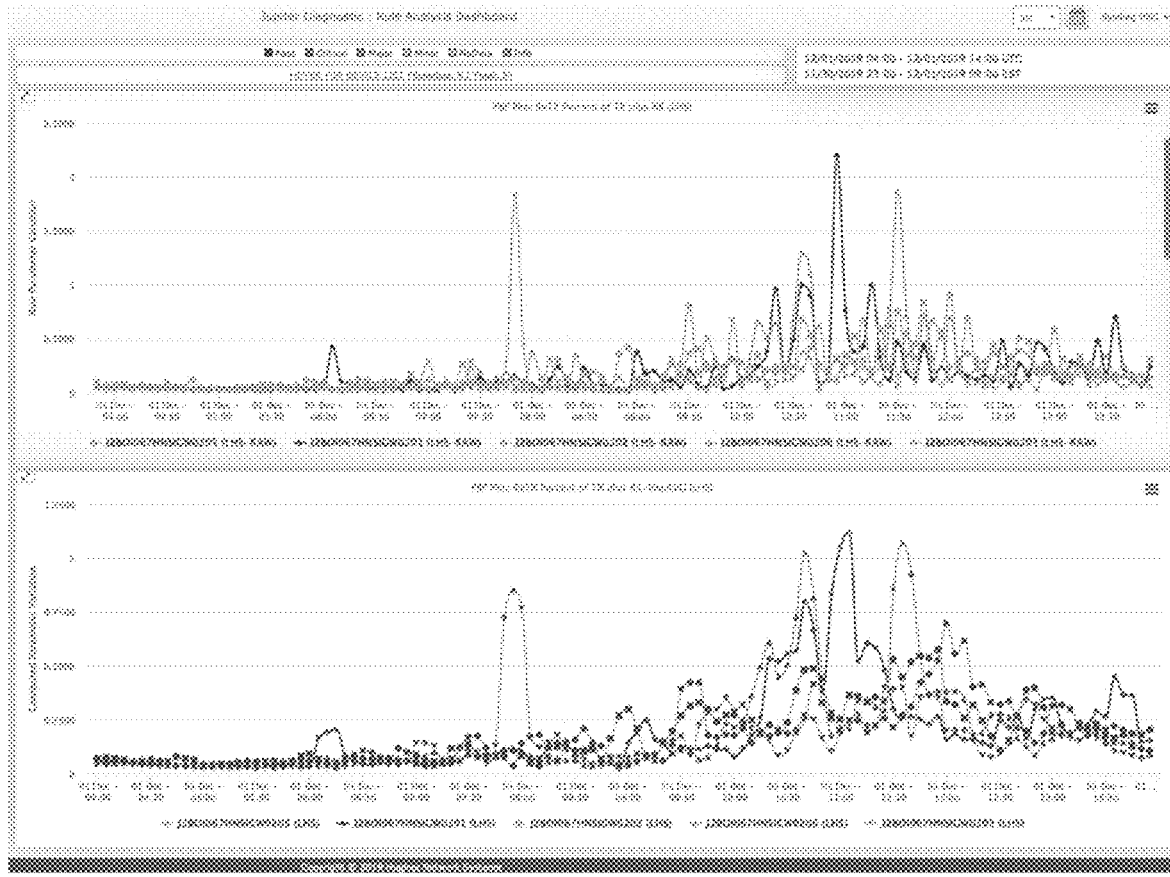
FIG. 8E illustrates a satellite's baseband packet device dashboard according to various embodiments.

FIG. 8E illustrates a satellite's baseband packet device dashboard according to various embodiments.

With FIG. 8D an operator may verify that a satellite's baseband packet router device dashboard shows that the IP gateways (IPGWs) have an increase in the packet re-transmits over the satellite link, and a utilization (User's payload) is reduced as user requests to Internet to browse are at a lower rate.

Figure 8F:
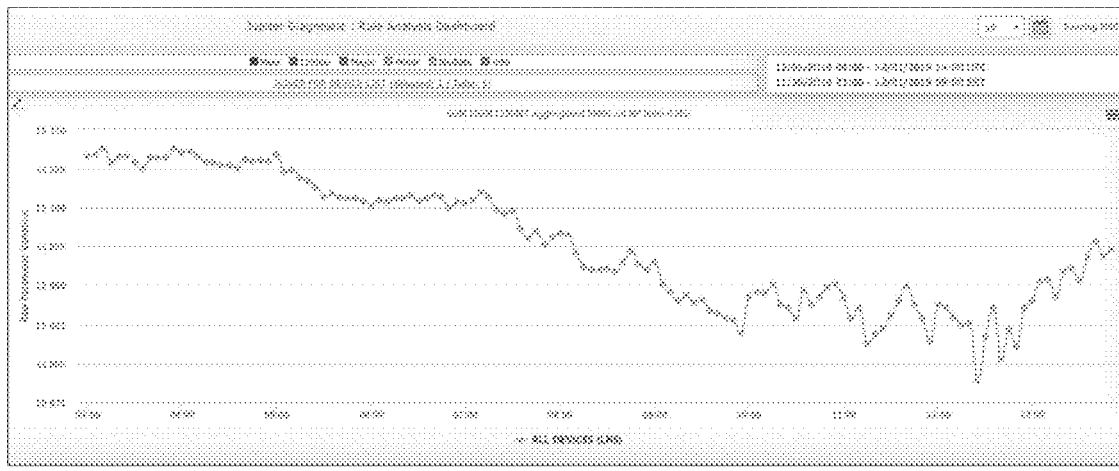
FIG. 8F illustrates a service ready terminals according to various embodiments.

FIG. 8F illustrates a service ready terminals according to various embodiments.

With FIG. 8D an operator may verify that service ready terminals show a decrease in numbers indicating the service for those users experiencing service degradation/major issues. This is the effect of weather affecting transport in Both Inroute and Outroute direction, used in the weather impact score computation.

Figure 9:
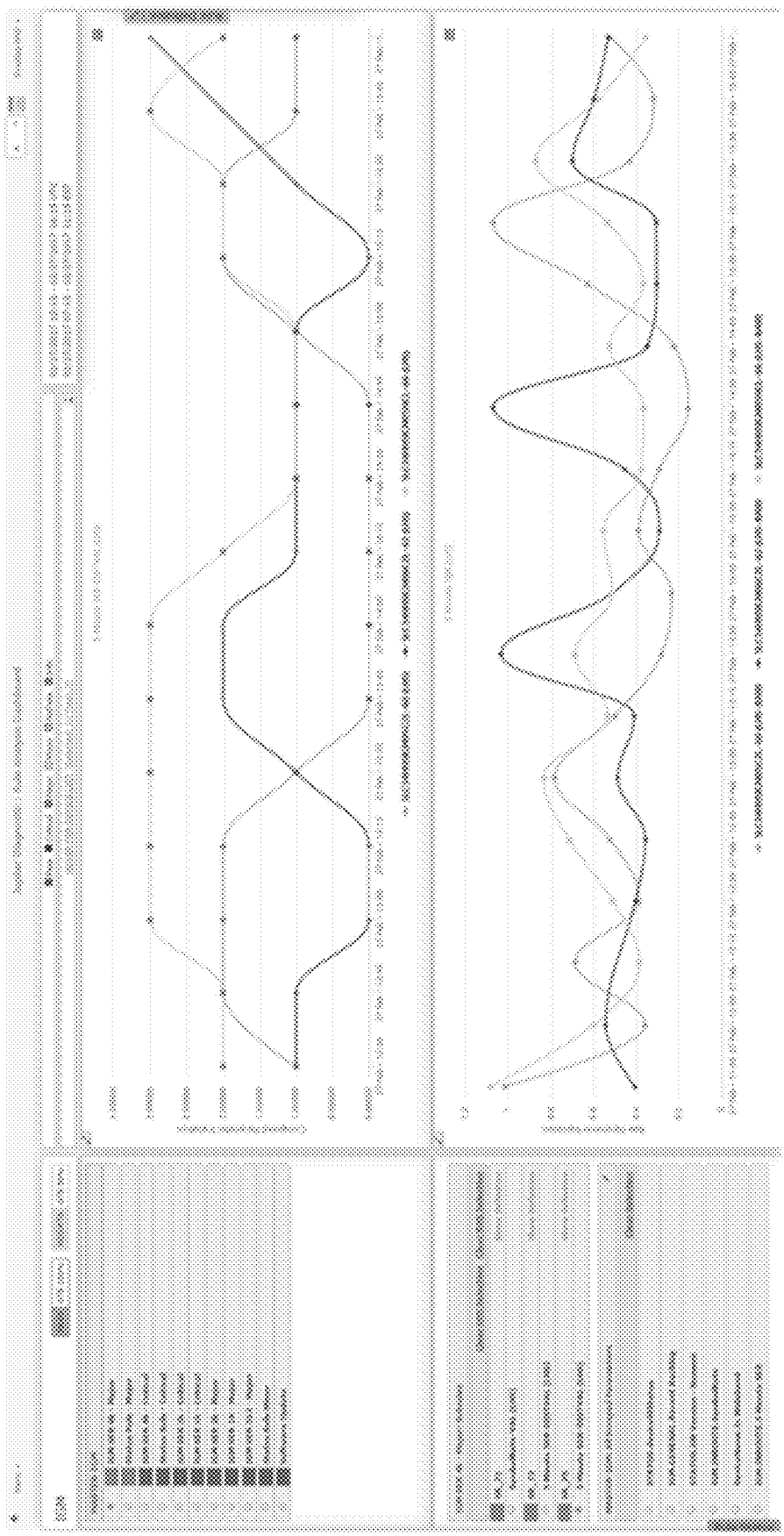
FIG. 9 illustrates trends and alarms discovered by ARBE based on the custom service monitoring rules according to various embodiments.

FIG. 9 illustrates trends and alarms discovered by ARBE based on the custom service monitoring rules according to various embodiments.

FIG. 9 is an image capture of an interactive chart displaying sampled data and smart-rule evaluation results in the selected network topology. The view of FIG. 9 highlights the network component on which configured service rules are failing.

Network Playback

FIG. 10 illustrates Network Play back with ARBE according to various embodiments.

This feature replays the status of the network at a selected time interval in the past, based on the stored network parameters and the status evaluated by the smart rule-engine at that point of time. When returning to a previous point in time, the entire status remains available. This allows the user to see the overall beam and gateway status, but also allows for the rest of the tools information to be viewed. An operator can go into the topology view for a beam and see that status, and then continue down into the information stored on any individual device. Rule results as well as raw statistics values are stored. Even if a statistic wasn't being used in a rule, as long as it was being collected it is available for historic analysis. In FIG. 10, the various beams and associated systems may be color coded to convey an associated operational status of the beam and/or system.

Weather Impact Determination on Satellite Based System

Figure 11:
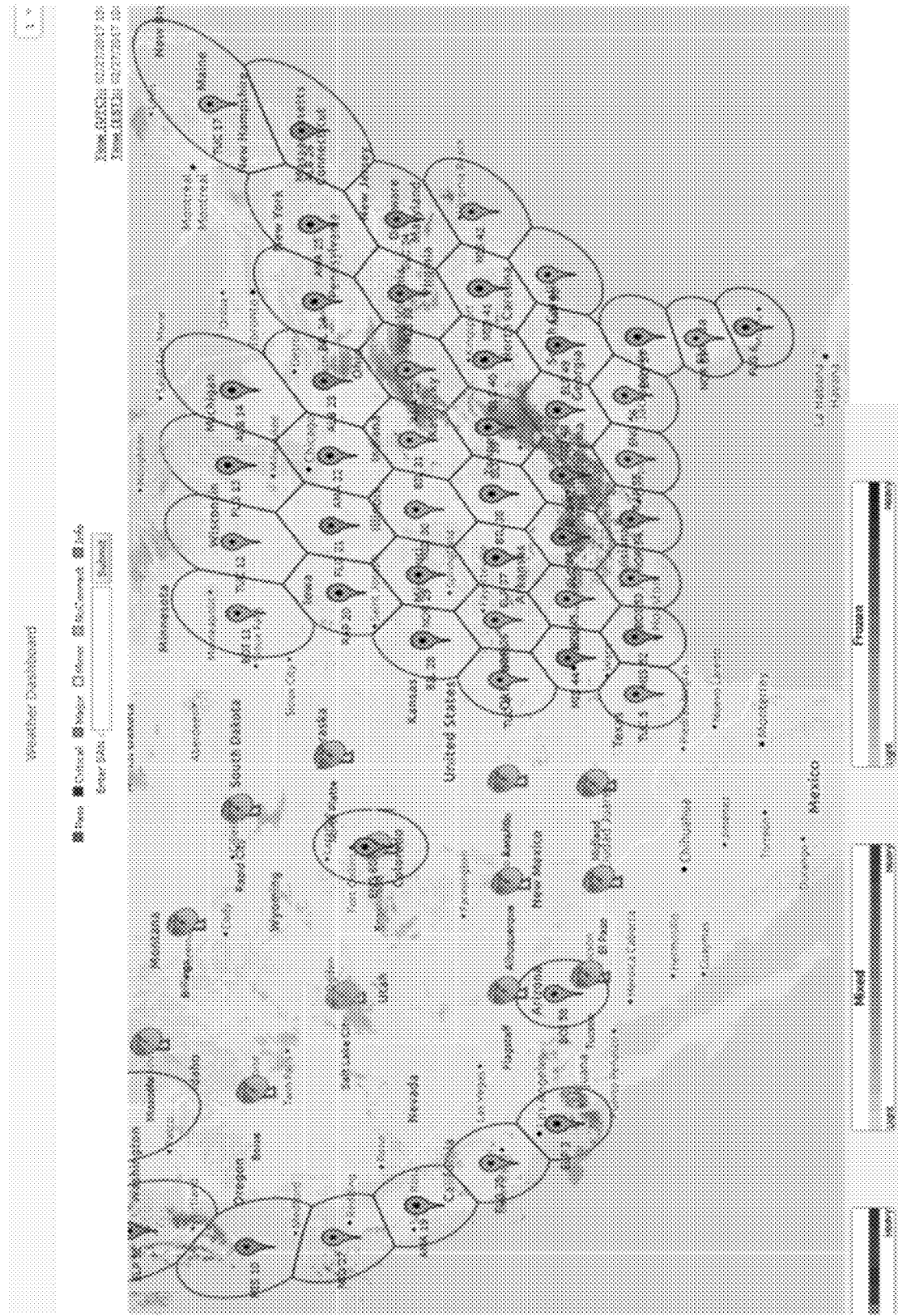
FIG. 11 illustrates weather impact determination with ARBE according to various embodiments.

FIG. 11 illustrates Weather Impact Determination with ARBE according to various embodiments.

ARBE computes the weather impact score based on the actual atmospheric conditions which affects satellite link correlating with actual satellite's link quality at a given interval of time. By taking the selected weather data at a physical location of a user terminal and a Gateway, and correlating that with the satellite link quality, ARBE can find out the service degradation, and points to the network elements that need operator focus/corrective steps, or if an error being detected is caused by a temporary weather condition which needs to be sent to operator as information only.

The present teachings disclose a service monitoring technique of an internet service based on information, such as, statistics from the terminal, statistics from a gateway, call trends, customer service trends, weather events, performance data from various tools and performs a Smart Analysis of various aspects of the service to identify issues.

The ARBE provides "smart eyes" to the network engineers by providing adaptive network monitoring capability by the innovative service-rule engine's evaluations based on intelligent thresholds computed by running machine learning algorithms on the parameters collected from various system components and associated systems information.

An example of integrating the weather impact score over time to identify a weather impact on the complex network may illustrate the effect of over-the-air transport between the satellite and a terminal in both directions 1 (Inroute and Outroute channels), where the associated channel conditions for both directions are used in the weather score computation. As illustrated in FIG. 6, the wedge 612 is represented in a different color to readily make apparent that the weather at the associated geographic area (identified within the wedge 612) is negatively affecting the associated inroute and outroute channel conditions An operator may drill-down on wedge 612 to view the rain fade's impact on the Inroute, Outroute, and a drop in the number of service-ready terminals in a specified interval. This drill-down is an example of the ARBE doing custom-correlation of events, weather and transport metrics to compute the weather impact score.

Having described preferred embodiments of a system and method (which are intended to be illustrative and not limiting), it is noted that modifications and variations can be made by persons skilled in the art considering the above teachings. It is therefore to be understood that changes may be made in the embodiments disclosed which are within the scope of the invention as outlined by the appended claims. Having thus described aspects of the invention, with the details and particularity required by the patent laws, what is claimed and desired protected by Letters Patent is set forth in the appended claims.

We claim as our invention:

1. A non-transient computer-readable storage medium having instructions embodied thereon, the instructions being executable by one or more processors to perform a method for service management of a complex network comprising satellite links, the method comprising:
   computing, at a computer, a respective current weather score based on a current weather for geographic areas within a coverage area of a satellite;
   predicting, based on historical information, an effect on one of the satellite links corresponding to the current respective weather score; and
   sending a notification about the effect,
   wherein the effect comprises a network degradation or a network failure, and
   the historical information comprises a weather impact score and transport related metrics comprising one or more of a bit error rate, a latency, a throughput, a congestion, and a packet loss rate.

2. The non-transient computer-readable medium of claim 1, wherein the historical information is based on correlating historical transport related metrics for the satellite links with the respective weather impact score.

3. The non-transient computer-readable medium of claim 1, wherein the method further comprises segregating, at the computer, weather-impacted and non-weather-impacted geographic areas based on the respective weather impact score.

4. The non-transient computer-readable medium of claim 3, wherein the method further comprises graphing, in near real-time, a status of the complex network illustrating the weather-impacted and non-weather-impacted geographic areas.

5. The non-transient computer-readable medium of claim 3, wherein the method further comprises graphing, in near real-time, a logical view of the satellite links based on the weather-impacted and non-weather-impacted geographic areas, and network elements forming the complex network.

6. The non-transient computer-readable medium of claim 3, wherein the method further comprises initiating corrective steps to cure the effect on the satellite links associated with the non-weather-impacted geographic areas.

7. The non-transient computer-readable medium of claim 3, wherein the method further comprises informing a customer service representative of the weather-impacted geographic areas.

8. The non-transient computer-readable medium of claim 1, wherein the method further comprises:
   receiving transport related metrics for the satellite links; and
   confirming, based on the transport related metrics, the effect.

9. The non-transient computer-readable medium of claim 1, wherein the complex network comprises nested networks and each of the nested networks comprises a subset of the satellite links.

10. The non-transient computer-readable medium of claim 1, wherein the method further comprises:
    discovering, in near real-time, the effect in the complex network of at least one of the satellite links; and
    compensating for the effect with another of the satellite links.

11. The non-transient computer-readable medium of claim 1, wherein the method further comprises playing back, in time, a status of the satellite links, the effect and a network element forming the complex network.

12. The non-transient computer-readable medium of claim 1, wherein the method further comprises:
    identifying a parameter for the satellite links and a threshold for the parameter with a machine learning algorithm; and
    adapting the threshold for the parameter based on the effect.

13. The non-transient computer-readable medium of claim 1, wherein the method further comprises integrating the weather impact score over time to identify a weather impact on the complex network.

14. A non-transient computer-readable storage medium having instructions embodied thereon, the instructions being executable by one or more processors to perform a method for service management of a complex network comprising satellite links, the method comprising:
    collecting statistics comprising network component statistics and network service statistics;
    standardizing, with an Adaptive Rule Based Engine (ARBE), the statistics;
    aggregating, for a duration, comparable statistics with the ARBE;
    correlating, with the ARBE, a network issue with the network service statistics;
    analyzing, with the ARBE, the network service statistics to determine a root cause of the network issue; and
    associating the network issue with one of the satellite links; and displaying a color-code icon for the one of the satellite links, wherein the color-code icon corresponds to a fault severity of a network element servicing the one of the satellite links.

15. The non-transient computer-readable medium of claim 14, wherein the standardizing comprises calculating a weather score for the duration.

16. The non-transient computer-readable medium of claim 14, wherein the method further comprises:
selecting one of the satellite links on a drill-down dashboard; and
displaying a detailed statistic associated with the selected satellite link.

17. The non-transient computer-readable medium of claim 14, wherein the method further comprises:
correlating, for each of the satellite links, events within and associated with the complex network to the network issue;
selecting one of the satellite links on a drill-down dashboard; and
displaying the respective events of the selected satellite link.

18. The non-transient computer-readable medium of claim 14, wherein the method further comprising:
correlating, for each of the satellite links, events within and associated with the complex network to the network issue; and
predicting a trend based on the correlating.

19. A non-transient computer-readable storage medium having instructions embodied thereon, the instructions being executable by one or more processors to perform a method for service management of a complex network comprising satellite links, the method comprising:
collecting statistics comprising network component statistics and network service statistics;
standardizing, with an Adaptive Rule Based Engine (ARBE), the statistics;
aggregating, for a duration, comparable statistics with the ARBE;
correlating, with the ARBE, a network issue with the network service statistics;
analyzing, with the ARBE, the network service statistics to determine a root cause of the network issue;
correlating, for each of the satellite links, events within and associated with the complex network to the network issue; and
suggesting an actionable item based on the correlating.

* * * * *